United States Patent
Hamlin et al.

(10) Patent No.: US 10,853,514 B2
(45) Date of Patent: Dec. 1, 2020

(54) SYSTEM AND METHOD TO MANAGE VERSIONING AND MODIFICATIONS OF CONTENT IN A CENTRALIZED CONTENT HANDLING SYSTEM

(71) Applicant: DELL PRODUCTS, LP, Round Rock, TX (US)

(72) Inventors: Daniel L. Hamlin, Round Rock, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 211 days.

(21) Appl. No.: 15/976,420

(22) Filed: May 10, 2018

(65) Prior Publication Data

US 2019/0347438 A1 Nov. 14, 2019

(51) Int. Cl.
| | |
|---|---|
| *G06F 21/60* | (2013.01) |
| *H04L 9/32* | (2006.01) |
| *G06F 21/62* | (2013.01) |
| *H04L 9/06* | (2006.01) |
| *G06F 16/93* | (2019.01) |

(52) U.S. Cl.
CPC .......... *G06F 21/6227* (2013.01); *G06F 16/93* (2019.01); *H04L 9/0643* (2013.01)

(58) Field of Classification Search
CPC ... H04L 9/32; H04L 63/12; H04L 9/00; G06F 21/60; G06F 21/30
USPC .... 713/161, 165, 168, 176, 191; 726/28, 29, 726/30
See application file for complete search history.

(56) References Cited

U.S. PATENT DOCUMENTS

| | | | |
|---|---|---|---|
| 7,051,275 B2 | 5/2006 | Gupta et al. | |
| 8,086,570 B2 | 12/2011 | Kawabe et al. | |
| 2006/0294152 A1 | 12/2006 | Kawabe et al. | |
| 2008/0040388 A1 | 2/2008 | Petri et al. | |
| 2017/0041296 A1* | 2/2017 | Ford | H04L 63/0421 |
| 2019/0377889 A1* | 12/2019 | Mertens | G06F 21/6209 |

* cited by examiner

*Primary Examiner* — Izunna Okeke
(74) *Attorney, Agent, or Firm* — Larson Newman, LLP

(57) ABSTRACT

A document management system includes a memory for storing machine-readable code and a processor configured to execute the machine-readable code. The processor stores a first document, a first hash of the first document, and a first key in the memory. The first document is encrypted with the first key. The processor further receives a request for the first key. The request includes a second hash of a second document where the second document is purported to be a copy of the first document. The processor further compares the first hash to the second hash and sends the first key in response to the request when the first hash matches the second hash.

12 Claims, 3 Drawing Sheets

SYSTEM AND METHOD TO MANAGE VERSIONING AND MODIFICATIONS OF CONTENT IN A CENTRALIZED CONTENT HANDLING SYSTEM

FIELD OF THE DISCLOSURE

This disclosure generally relates to information handling systems, and more particularly relates to managing versioning and modifications of content in a centralized content handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A document management system may store a first document, a first hash of the first document, and a first key in the memory. The first document may be encrypted with the first key. A request for the first key may include a second hash of a second document where the second document is purported to be a copy of the first document. The first hash may be compared to the second hash, and the first key sent in response to the request when the first hash matches the second hash.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
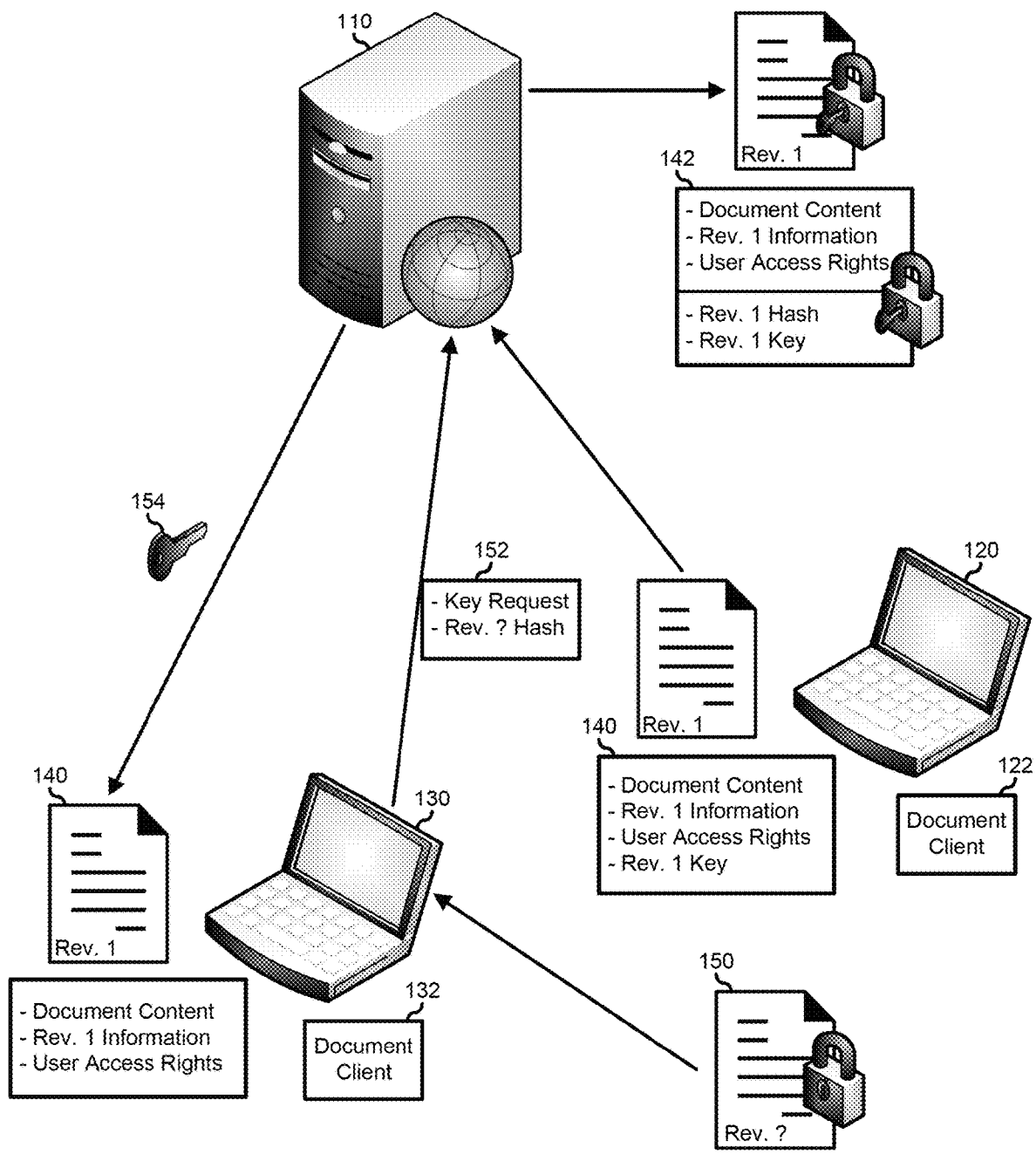
FIGS. 1 and 2 are block diagrams of a document handling system according to an embodiment of the present disclosure.

FIG. 1 illustrates an embodiment of a document handling system 100. Document handling system 100 represents a centrally managed enterprise-level system for protection and maintenance of enterprise documents. As such, document handling system 100 ensures confidentiality, integrity, and availability of the documents that are managed thereby. In particular, confidentiality is maintained by ensuring that all documents handled by document handling system 100 are encrypted at all locations in the document handling system. Integrity is maintained by providing document owners with the ability to generate encryption keys and to manage document accountability, versioning, and auditing. Document availability is provided by permitting collaboration with external parties by granting document access rights, setting document time-to-live dates, and restricting print and export functionality. As used herein, a document may be understood to include office productivity documents, such as files associated with an office productivity suite like the Microsoft Office suite of office productivity files, or the like, such as Word files, Excel files, Visio files, or files associated with other office productivity applications. In addition, a document may be understood to include text based files, such as files that use a CSV format, note files, or other text based files. Further, a document may be understood to include media content files associated with various audio and multimedia formats, such as WAV files, MP files (MP3, MP4, etc.), or the like. Moreover, a document may be understood to include other proprietary format files that can be encoded and have modifications made thereto, as needed or desired.

Document handling system 100 includes a document management system 110 and user client systems 120 and 130. Document management system 110 represents one or more information handling systems configured to store, distribute, archive, and maintain content on document handling system 100. In a particular embodiment, document handling system 110 implements a simple and scalable mechanism for managing versioning of the documents handled by document handling system 100 and for preventing and detecting unauthorized tampering or modification of the contents of the documents. Client system 120 represents an information handling system used by a user to create an original document 140 on document handling system 100. Here, document 140 is deemed an original document in that it is loaded into document handling system 100 as a handled document under the control of the user, and hence is designated as a revision level one (1) document. As such, document 140 is not necessarily deemed an original document because the content of the document is originally created by the user. Here, client system 120 includes programs or software to create, manage, modify, edit, or otherwise open document 140, such as an office productivity suite, a text editor, a media content application, a proprietary document program, or the like.

In addition, client system 120 includes a document handling client 122 that operates to receive document 140 and to format the document to the needs and requirements of document handling system 100. In particular, document handling client 122 operates to provide metadata related to document 140, such as identification of the user of client system 120, a creation date for the document, and other information as needed or desired. Further, document handling client 122 provides an interface for the user of client system 120 to ascribe user access rights to document 140. For example, the user can define a group of users who have access to document 140, can define a type of access that is granted to each user, can provide a time-to-live or expiration date for the document, or can define other user access rights, as needed or desired. After document 140 is formatted, document handling client 122 operates to encrypt the document, and to upload the encrypted document and the key to document management system 110.

Document management system 110 operates to store the encrypted document 142 and to manage the user rights and distribution of the document. Further, document management system 110 operates to calculate a hash of document 140 and to store it with the encrypted document 142. The hash of document 140 can be provided based upon a particular hash function to provide assurance that all future copies of document 140 are authentic and untampered with. For example, if some document that is purporting to be document 140 has altered content from document 140, then the operation of the hash function on the purported document will yield a different hash value that that derived for document 140, and thus the purported document can be discarded as having been altered and therefore not the authentic version of document 140. An example of a hash function includes a hash function that utilizes a hash algorithm that is in accordance with a National Institute of Standards and Technology (NIST) Secure Hash Standard (SHS), such as one or more of Secure Hash Algorithms: SHA-1, SHA-2, SHA-3, or their variants. In a particular embodiment, document handling client 122 operates to calculate the hash of document 140 and to send it to document management system 110 when client system 110 sends the document to the document management system.

Client system 130 represents an information handling system used by a user to open and view document 140 on document handling system 100, and, if the user is so authorized, to edit and change the contents of document 140. Here, client system 130 receives an encrypted document 150 that purports itself to be the revision level one (1) version of document 140. Client system 130 includes a document handling client 132 that operates to receive document 150 and to calculate a hash of document 150, and to send the hash value and a key request 152 to document management system 110. The hash algorithm used to generate the hash of document 150 is pre-defined to be the same hash algorithm that document management system 110 utilized to generate the hash of document 140. As such, if the hash value received from client system 130 for document 150 matches the hash value of encrypted document 142, document management system 110 determines that document 150 is as it purports itself to be, that is, that document 150 is in fact an unaltered copy of document 140 and the document management system sends key 154 to client system 130. There, document handling client 132 utilized key 154 to decrypt document 150 to reveal the content of the original document 140. Then, the user of client system 130 can open and view the document 140, edit and change the contents of document 140 if so authorized.

On the other hand, if the hash value received from client system 130 for document 150 does not match the hash value of encrypted document 142, document management system 110 determines that document 150 is not as it purports itself to be, that is, that document 150 is in fact an altered copy of document 140, and the document management system denies key 154 to client system 130. There, the user of client system 130 is unable to decrypt document 150. In a particular embodiment, document management system 110 provides an alert to the originator of document 140 when a document that falsely purports itself to be document 140 is detected, that is when a key request for key 154 is received with a hash value that does not match the hash value of encrypted document 142. Note that documents in document handling system 100 may include formatting information which tags the documents as being associated with the document handling system. Thus, document 150 may include formatting information that is the same as the formatting information of document 140, but may further include different or altered content. Thus, document 150 may be passed off as document 140 for the purposes of transferring documents within document handling system 100, for example by having a common name as document 140. However, whether or not document 150 is actually document 140 is not determinable until the hash of document 150 is checked against the hash of document 140 by document management system 110.

Figure 2:
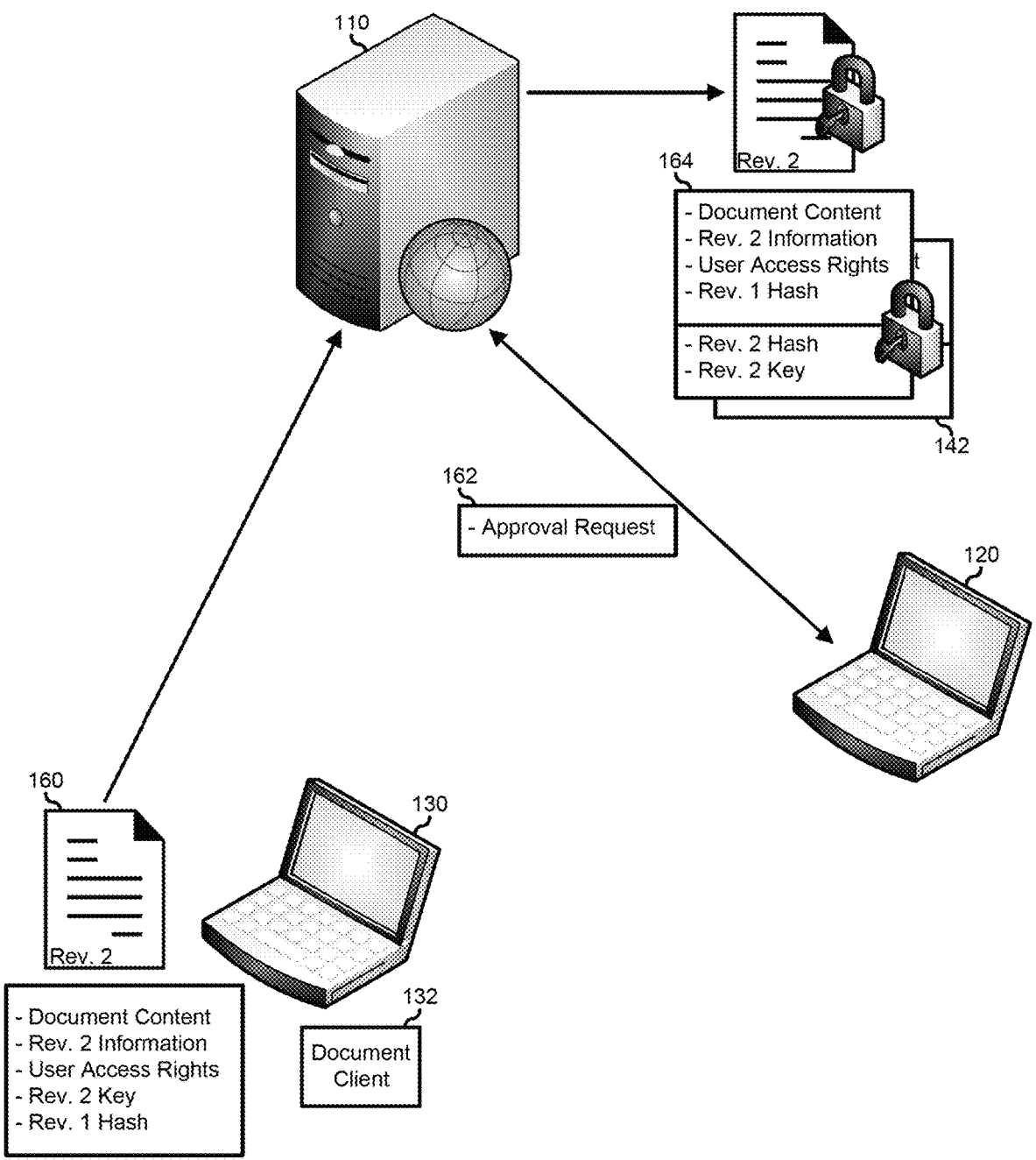

FIG. 2 illustrates document handling system 100, where client system 130 has made changes to document 140 to create modified document 160 on document handling system 100. Document 160 is designated a revision level two (2) document. Document handling client 132 operates to format document 160 to the needs and requirements of document handling system 100. In particular, document handling client 132 operates to provide metadata related to document 160, such as identification of the user of client system 130, a modification date for the document, and other information as needed or desired. In a particular embodiment, the formatting for document 160 includes a hash of the original document 140. In this way, a revision history of document 140 and the subsequent revisions can be maintained. After document 160 is formatted, document handling client 132 operates to encrypt the document, and to upload the encrypted document and the key to document management system 110.

Upon receiving the encrypted document 160 and the key to the document, document management system 110 sends a document modification authorization request 162 to client system 120. The user of client system 120, that it, the author of document 140, can approve or deny document modification authorization request 162. If request 162 is denied, document management system 110 informs client system 130 of the denial, and so does not accept the encrypted document 160 and the key to the document. Here, the user of client system 130 may opt to create document 160 as a new document on document handling system 100, by, for example, renaming document 160, and thereby disconnecting document 160 from the authentication chain to document 140.

Alternatively, the user of client system 130 may opt to obtain approval to update document 140 from the user of client system 120, for example, via out-of-system communications between the users. If document modification authorization request 162 is approved by the user of client system 120, then document management system 110 operates to store the encrypted document 162 and to manage the user rights and distribution of the document. Further, document management system 110 operates to calculate a hash of document 160 and to store it with the encrypted document 162.

Figure 3:
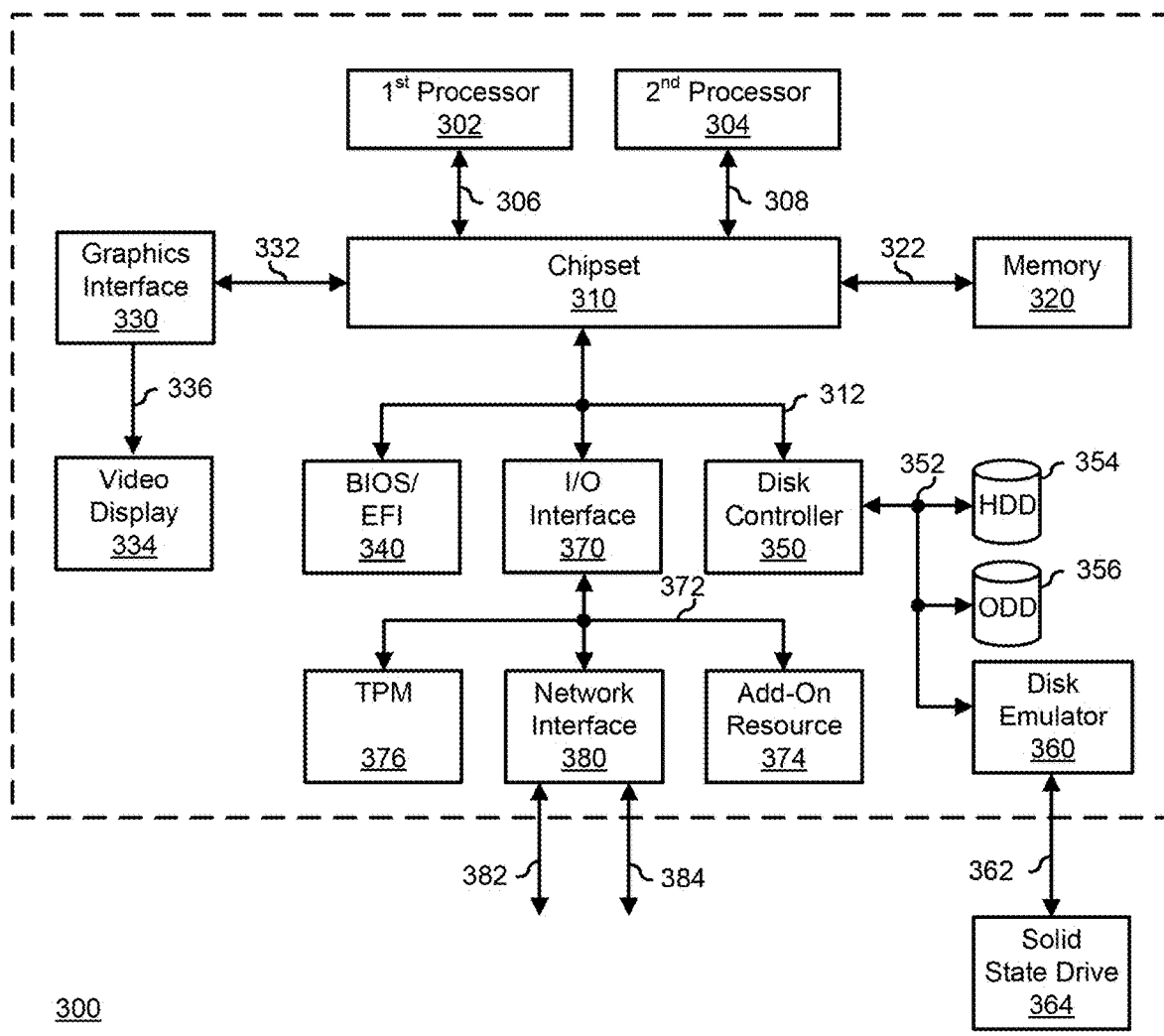
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A document management system, comprising:
a memory for storing machine-readable code; and
a processor configured to execute the machine-readable code to:
receive, from a first client system, a first document, a first hash of the first document, an expiration date for the first document, a list identifying a plurality of users who have access to the first document, each user being associated with an access level for the first document, and a first key in the memory, wherein the first document is encrypted with the first key;
receive, from a second client system, a request for the first key, the request including a second hash of a second document and an identification of a user associated with the request, the second document purported to be a copy of the first document;
compare the first hash to the second hash;
determine if the access information includes the identification based upon the list;
send, to the second client system, the first key in response to the request when the first hash matches the second hash, and when the access information includes the identification;
direct the second client system to grant the user access to the first document in accordance with the access level associated with the user;
receive a third document, a third hash, and a second key from the second client system, wherein the third document is encrypted with the second key, and wherein the third document includes the first hash; and
store the third document, the third hash, and the second key in the memory.

2. The document management system of claim 1, wherein the processor is further configured to execute the machine-readable code to:
provide an indication that the second document is not the copy of the first document in response to the request when the first hash does not match the second hash.

3. The document management system of claim 1, wherein the processor is further configured to execute the machine-readable code to:
send an approval request to the first client system in response to receiving the third document.

4. The document management system of claim 3, wherein the third document, the third hash, and the second key are stored in the memory in response to an approval from the first client system.

5. The document management system of claim 1, wherein the processor is further configured to execute the machine-readable code to:
store access information associated with the first document in the memory.

6. A method of managing digital documents, the method comprising:
receiving, by a processor of a document management system, a first document from a first client system, a first hash of the first document, an expiration date for the first document, a list identifying a plurality of users who have access to the first document, each user being associated with an access level for the first document, and a first key, wherein the first document is encrypted with the first key;
receiving, by the processor, a request for the first key from a second client system, the request including a second hash of a second document and an identification of a user associated with the request, the second document purported to be a copy of the first document;
comparing, by the processor, the first hash to the second hash;
determining if the access information includes the identification based upon the list;
sending, by the processor, the first key to the second client system in response to the request when the first hash matches the second hash, and when the access information includes the identification;
direct the second client system to grant the user access to the first document in accordance with the access level associated with the user;
receiving a third document, a third hash, and a second key from the second client system, wherein the third document is encrypted with the second key, and wherein the third document includes the first hash; and storing the third document, the third hash, and the second key in the memory.

7. The method of claim 6, further comprising:
providing an indication that the second document is not the copy of the first document in response to the request when the first hash does not match the second hash.

8. The method of claim 6, further comprising:
sending an approval request to the first client system in response to receiving the third document.

9. The method of claim 8, wherein the third document, the third hash, and the second key are stored in a memory in response to an approval from the first client system.

10. The method of claim 6, further comprising:
storing access information associated with the first document.

11. The method of claim 6, wherein the request further includes an identification of a user associated with the request, the method further comprising:
determining if the access information includes the identification based upon the list, wherein sending the key is in further response to the access information including the identification.

12. A digital document management system, comprising:
a first system configured to:
  create a first document;
  provide an expiration date for the first document;
  provide a list identifying a plurality of users who have access to the first document, each user being associated with an access level for the first document;
  determine a first hash of the first document; and
  encode the first document with a first key;
a second system configured to:
  receive the first document, the first hash, the expiration date, the list, and the first key from the first system; and
  store the first document, the first hash the list, and the first key; and
a third system configured to:
  receive a second document purported to be a copy of the first document;
  determine a second hash of the second document; and
  request the key from the second system, the request including the second hash and an identification of a user associated with the request;
wherein the second system is further configured to:
  compare the first hash to the second hash;
  determine if the access information includes the identification based upon the list;
  send the first key to the second system in response to the request when the first hash matches the second hash, and when the access information includes the identification;
  direct the second client system to grant the user access to the first document in accordance with the access level associated with the user;
  receive a third document, a third hash, and a second key from the third system, wherein the third document is encrypted with the second key, and wherein the third document includes the first hash; and
  store the third document, the third hash, and the second key.

* * * * *